US010216734B2

(12) United States Patent
Weinberg et al.

(10) Patent No.: US 10,216,734 B2
(45) Date of Patent: Feb. 26, 2019

(54) COMPLEMENTARY AND SHADOW CALENDARS

(71) Applicant: Microsoft Technology Licensing, LLC, Redmond, WA (US)

(72) Inventors: Shira Weinberg, Tel Aviv (IL); Haim Somech, Ramat Gan (IL); Scott Vernon Fynn, Seattle, WA (US); Uri Barash, Tel Mond (IL); Colleen Elizabeth Hamilton, Seattle, WA (US); Robert J. Howard, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/120,977

(22) Filed: Sep. 4, 2018

(65) Prior Publication Data

US 2018/0373707 A1 Dec. 27, 2018

Related U.S. Application Data

(63) Continuation of application No. 14/154,554, filed on Jan. 14, 2014, now Pat. No. 10,089,310.

(51) Int. Cl.
*G06F 17/30* (2006.01)
*H04L 29/08* (2006.01)
(Continued)

(52) U.S. Cl.
CPC .... *G06F 17/3002* (2013.01); *G06F 17/30672* (2013.01); *G06Q 10/109* (2013.01);
(Continued)

(58) Field of Classification Search
None
See application file for complete search history.

(56) References Cited

U.S. PATENT DOCUMENTS 8,510,123 B2 * 8/2013 Bonev ............... G06F 17/30029
705/1.1
9,444,774 B2 * 9/2016 Krishna .................. G06F 1/329
(Continued)

FOREIGN PATENT DOCUMENTS

CN 101001427 A 7/2007
CN 101079125 A 11/2007
(Continued)

OTHER PUBLICATIONS

"Office Action Issued in European Patent Application No. 14831138. 4", dated Jun. 12, 2018, 4 Pages.
(Continued)

*Primary Examiner* — Gurkanwaljit Singh
(74) *Attorney, Agent, or Firm* — Shook, Hardy & Bacon L.L.P.

(57) ABSTRACT

One or more techniques and/or systems are provided for constructing a complementary calendar and/or a shadow calendar. A user may maintain a primary calendar within which the user may schedule user specified tasks and/or meetings, but may inadvertently omit other entries. Accordingly, a complementary calendar may be constructed based upon inferences derived from user signal data (e.g., information used to identify/infer activities of the user, such as social network profile information, messages, temporal information, locational information, documents, etc.). The complementary calendar may be automatically populated with entries corresponding to inferences derived from user signals and/or real-time conditions (e.g., weather, store hours, traffic conditions, etc.). The primary calendar and the complementary calendar may be merged to create a shadow calendar. The complementary calendar and/or the shadow calendar may be displayed to the user and/or may be used to
(Continued)

provide dynamic notifications and/or suggestions to the user (e.g. regarding conflicting entries/obligations, etc.).

20 Claims, 10 Drawing Sheets

(51) Int. Cl.
- H04L 12/58 (2006.01)
- H04H 60/33 (2008.01)
- G06Q 10/10 (2012.01)
- G06Q 30/02 (2012.01)
- G06Q 50/00 (2012.01)

(52) U.S. Cl.
CPC ..... *G06Q 10/1093* (2013.01); *G06Q 30/0273* (2013.01); *G06Q 50/01* (2013.01); *H04H 60/33* (2013.01); *H04L 51/066* (2013.01); *H04L 67/24* (2013.01)

(56) References Cited

U.S. PATENT DOCUMENTS

| | | | |
|---|---|---|---|
| 9,554,356 B2* | 1/2017 | Dotan-Cohen ... | H04M 3/42365 |
| 10,089,310 B2 | 10/2018 | Weinberg et al. | |
| 2004/0064567 A1* | 4/2004 | Doss ............. | G06Q 10/063114 |
| | | | 709/228 |
| 2008/0119132 A1* | 5/2008 | Rao ............. | G06Q 30/02 |
| | | | 455/3.04 |
| 2009/0152349 A1* | 6/2009 | Bonev ............. | G06Q 30/00 |
| | | | 235/383 |
| 2009/0157513 A1* | 6/2009 | Bonev ............. | G06F 17/30029 |
| | | | 705/14.69 |
| 2009/0157693 A1* | 6/2009 | Palahnuk ............. | G06Q 30/00 |
| 2011/0153629 A1* | 6/2011 | Lehmann ............. | G06Q 10/06 |
| | | | 707/758 |
| 2011/0197236 A1* | 8/2011 | Rao ............. | G06Q 30/02 |
| | | | 725/74 |
| 2012/0117568 A1* | 5/2012 | Plotkin ............. | G06F 9/4843 |
| | | | 718/100 |
| 2014/0149592 A1* | 5/2014 | Krishna ............. | G06F 1/329 |
| | | | 709/226 |
| 2014/0149771 A1* | 5/2014 | Krishna ............. | G06F 1/329 |
| | | | 713/323 |
| 2014/0280292 A1* | 9/2014 | Skinder ............. | G06F 17/30448 |
| | | | 707/767 |
| 2014/0280575 A1* | 9/2014 | Cowan ............. | H04L 67/22 |
| | | | 709/204 |
| 2015/0186110 A1* | 7/2015 | Kannan ............. | G06F 3/167 |
| | | | 715/728 |
| 2015/0205465 A1* | 7/2015 | Robison ............. | G06F 3/0484 |
| | | | 715/744 |
| 2015/0324753 A1* | 11/2015 | Dantuluri ............. | G06Q 10/1095 |
| | | | 705/7.19 |
| 2016/0249319 A1* | 8/2016 | Dotan-Cohen ... | H04M 3/42365 |

FOREIGN PATENT DOCUMENTS

| | | |
|---|---|---|
| CN | 101945235 A | 1/2011 |
| JP | 2003162512 A | 6/2003 |
| JP | 2004005652 A | 1/2004 |
| JP | 2005228020 A | 8/2005 |
| JP | 5059465 B2 | 10/2012 |
| KR | 1020070054476 A | 5/2007 |
| RU | 2395841 C2 | 7/2010 |

OTHER PUBLICATIONS

"Office Action Issued in Russian Patent Application No. 2016128432", dated Aug. 3, 2018, 7 Pages. (W/o English Translation).
"Office Action and Search Report Issued in Mexican Patent Application No. MX/a/2016/009172", dated Feb. 20, 2018, 5 Pages.
"Office Action Issued in Japanese Patent Application No. 2016-543141", dated Oct. 17, 2018, 11 Pages.
"First Office Action and Search Report Issued in Chinese Patent Application No. 201480047962.0", dated Nov. 14, 2018, 8 Pages.

* cited by examiner

COMPLEMENTARY AND SHADOW CALENDARS

CROSS-REFERENCE TO RELATED APPLICATIONS

This application is a continuation of U.S. application Ser. No. 14/154,554 filed Jan. 14, 2014, entitled "COMPLEMENTARY AND SHADOW CALENDARS," the entirety of which is incorporated by reference herein.

BACKGROUND

Many users maintain primary calendars for managing meetings and/or specific tasks. For example, a user may maintain a social network calendar within a social network and/or an office productivity calendar within an office suite. The user may populate such primary calendars with user entries, such as a work meeting entry, a get gas entry, and/or other user entries specified by the user.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for constructing a complementary calendar and/or a shadow calendar are provided herein (e.g., where a user opts-in and/or otherwise acquiesces to the same). A user may have a primary calendar through which the user may create user entries for meetings, events, activities, and/or tasks. However, the primary calendar may not take into account certain obligations, conflicting appointments, etc. (e.g., an obligation that the user fails to enter into the primary calendar, an obligation saved in a different calendar than the primary calendar such as a social network calendar and thus not taken into account by the primary calendar, a commute time from home to work that is not entered into the primary calendar (e.g., and thus not indicated as time that the user may be unavailable to attend a meeting)). Accordingly, as provided herein, a complementary calendar may be constructed based upon user signals associated with a user of a device. In an example, a social network profile (e.g., social network posts, social network messages, a user profile indicating hobbies or interest of the users, etc.) may be evaluated to identify an activity of the user as the user signal (e.g., a Monday dinner activity with Jen may be identified based upon Jen posting a message "let's do dinner next Monday" on the user's social network profile). In another example, a context of the user's device may be evaluated to identify an activity of the user as the user signal (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week; etc.). It may be appreciated that a wide variety of information, such as temporal information and/or locational information, may be evaluated to identify user signals and/or supplement user signals (e.g., the primary calendar may be used to identify conflicts and/or verify activities derived from user signals; a user signal may be evaluated against real-time data. such as traffic information, weather, or supplemental information, in order to generate a dynamic notification and/or suggestion, such as a suggestion to bring an umbrella to watch a soccer game because it is raining; etc.). In this way, the complementary calendar may be constructed with one or more entries derived from user signals (e.g., automatically generated entries based upon inferred activities).

In an example, the complementary calendar may be merged with one or more calendars (e.g., the primary calendar, a family calendar, a social network calendar, etc.) to create a shadow calendar comprising at least some of the complementary calendar (e.g., automatically generated entries derived/inferred from user signals) and at least some of the one or more calendars (e.g., user entries populated within the primary calendar by the user). Scheduling conflicts may be identified based upon the complementary calendar and/or the shadow calendar (e.g., a user entry may indicate that the user has a 9:00-9:30 Monday work meeting and an entry within the complementary calendar may indicate that the user is to meet his a friend for coffee at 9:15 on Monday based upon a social network post). A conflict alert and/or a conflict suggestion may be provided based upon the conflict (e.g., a conflict suggestion to send an automated message to the friend for rescheduling the coffee meeting until after the 9:00 work meeting, such as at 9:45 based upon a 15 minute commute from work to the coffee shop). The complementary calendar and/or the shadow calendar may be provided, such as displayed, to the user (e.g., through a web service, a website, an app, a social network profile, a mobile device, etc.). In an example, suggestions (e.g., a suggestion to try a new restaurant based upon a dinner date entry within the complementary calendar and a restaurant opening article mined from a news website), dynamic notifications (e.g., a notification to wear a rain jacket based upon a running entry within the complementary calendar and weather information), alerts (e.g., an alert of an upcoming activity within the complementary calendar), conflicts, and/or other information may be provided based upon the complementary calendar and/or the shadow calendar (e.g., as opposed to merely displaying such calendars).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
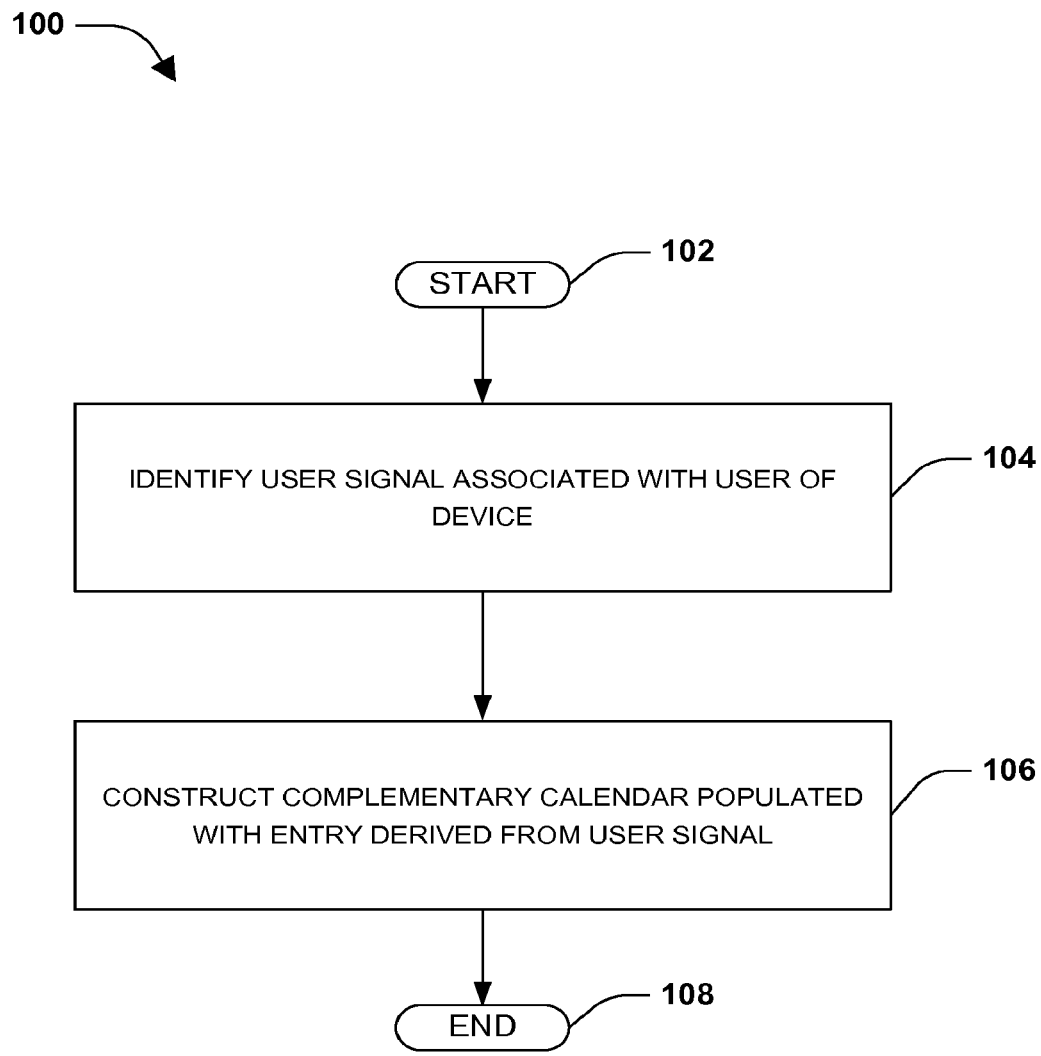
FIG. 1 is a flow diagram illustrating an exemplary method of constructing a complementary calendar.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of constructing a complementary calendar is illustrated by an exemplary method 100 of FIG. 1. At 102, the method starts. At 104, a user signal associated with a user of a device (e.g., a mobile device, a personal computer, a GPS device, a sports watch, glasses, a videogame console, a vehicle embedded system, etc.) may be identified. In an example, a social network profile of the user may be evaluated to identify an activity of the user as the user signal, such as a baseball game activity identified from a social network post and message between the user and another user. In another example, a device context (e.g., a device location, a device time, a mode of transportation, a device location check-in, an alarm, a charging state, a connectivity state, or user data stored on the device), such as a video game console preorder receipt stored on the device, may be evaluated to identify a video game console release pickup activity. In another example, the user signal may comprise temporal information, locational information, and/or a wide variety of information that may be used to identify a (e.g., recurring) activity based upon the user signal (e.g., the device may have a location corresponding to a breakfast restaurant on Saturdays, which may indicate the user has a routine of eating breakfast at the breakfast restaurant on Saturdays).

At 106, a complementary calendar may be constructed. The complementary calendar may be populated with one or more entries derived from user signals. For example, an entry may correspond to an activity or recurring activity identified from the user signal. In this way, the complementary calendar may be automatically populated with a plurality of entries corresponding to inferences derived from user signals, real-time conditions (e.g., a videogame launch date news article and hours of a store may be used to create a preordered videogame console pickup activity), or a primary calendar of the user (e.g., a commute home activity from 12:00 to 12:40 may be derived from a Saturday 11:00-12:00 lunch meeting user entry within a primary calendar, and may be scheduled based upon an estimated commute from a location of the lunch meeting to home). In an example, a user activity inference may be generated based upon the primary calendar (e.g., a book flight and hotel task may be used to infer a rent car user activity inference). The user activity inference may be populated within the complementary calendar as a second entry. In an example, the entry within the complementary calendar may be verified and/or adjusted based upon the primary calendar (e.g., a recurring Saturday breakfast entry may be invalidated based upon the primary calendar indicating the user will be traveling on a business trip out of town on Saturday).

In an example, the complementary calendar may be displayed. For example, the complementary calendar may be display on the device or may be made available to other devices, such as through a website, web service, or cloud service. Because an entry may be created as an inference of an activity that the user may perform, the entry may be augmented based upon a confidence metric indicative of a confidence that the entry corresponds to an activity that the user will actually perform (e.g., a rent car user activity inference may be a low confidence rating because the user may not need to rent a car while on vacation, and thus a rent car entry may be augmented, such as displayed in grey as opposed to a more prominent color).

Notifications, dynamic notifications, suggestions, conflicts, and/or other information may be provided based upon the complementary calendar (e.g., regardless of whether or not the complementary calendar is displayed to the user). In an example, a notification of an entry may be provided (e.g., an alert of an upcoming breakfast activity may be provided). In another example, a dynamic notification may be provided based upon evaluating a user signal against traffic information, weather information, real-time data (e.g., business hours; a news article indicating a closure of a business; a social network profile of a park indicating a closure of a running trail due to flooding; etc.), and/or supplemental information. For example, a dynamic notification to try a different running trail as opposed to a flooded running trail may be provided based upon a running activity entry and a social network profile of the park. In another example, a notification of a meeting attendance delay may be provided to one or more meeting attendees of a meeting based upon traffic information and/or a current location of a user indicating that the user will be late to the meeting. In another example, a suggestion may be provided based upon the user signal and/or the complementary calendar (e.g., a suggestion to watch a new trailer for a movie based upon a user signal corresponding to a social network message from Colleen to the user about seeing the movie).

In an example, the complementary calendar may be merged with the primary calendar to create a shadow calendar comprising at least some of the complementary calendar (e.g., automatically generated entries derived/inferred from user signals) and at least some of the primary calendar (e.g., user entries populated within the primary calendar by the user). Scheduling conflicts may be identified based upon the complementary calendar and/or the shadow calendar (e.g., a user entry may indicate that the user has a gardening meeting from 3:00-4:00 on Sunday, and an entry within the complementary calendar may indicate that the user is to deliver a package to a friend at 3:30 on Sunday). A conflict alert and/or a conflict suggestion may be provided based upon the conflict (e.g., a conflict suggestion to deliver the package at 4:45 and/or to send an automated message to the friend about the new delivery time). In an example, the shadow calendar may be displayed to the user and/or may be used to provide notifications, dynamic notifications, suggestions, conflicts, and/or other information (e.g., regardless of whether or not the shadow calendar is displayed to the user). At 108, the method ends.

Figure 2:
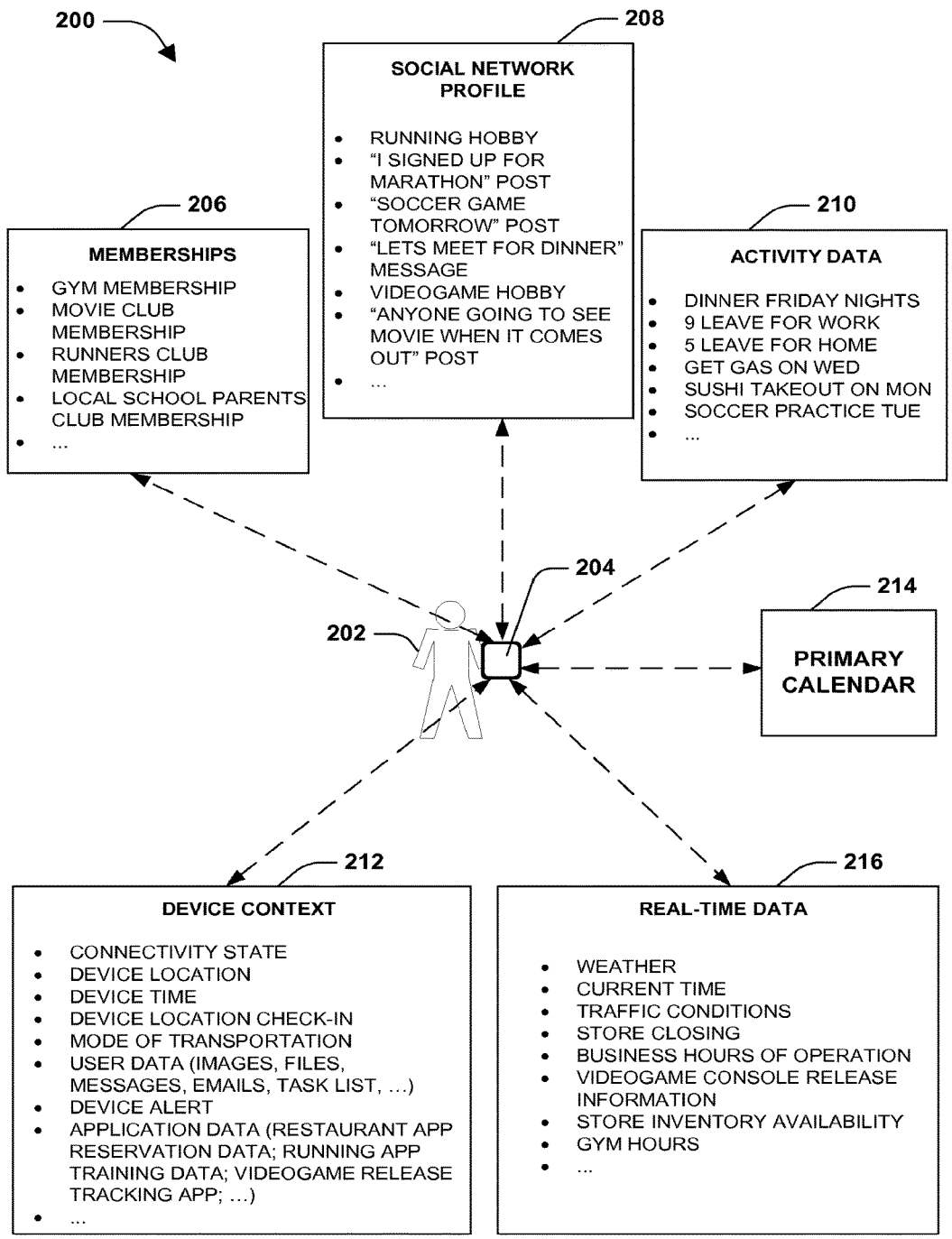
FIG. 2 is an illustration of an example of identifying user signals associated with a user of a device.

FIG. 2 illustrates an example 200 of identifying user signals associated with a user 202 of a device 204. In an example, memberships 206 of the user 202 may be identified as user signals (e.g., a gym membership may be used to identify a workout location for the user; a movie club membership may be used to identify a preferred movie theater and/or coupons for the user; etc.). In another example, a social network profile 208 may be evaluated to identify user signals (e.g., an "I signed up for marathon" post may be used to identify a marathon activity; a "lets meet for dinner" message may be used to identify a dinner activity; etc.). In another example, a device context 212 may be evaluated to identify user signals (e.g., reservation data of a restaurant app on the device 204 may be used to identify a dinner activity; a videogame release tracking app may be used to identify a preorder video game console activity; etc.). In another example, real-time data 216 may be evaluated to identify and/or evaluate user signals (e.g., gym hours; store inventory available for a videogame console; a closing of a coffee shop that the user routinely visits on Saturday; etc.). In another example, activity data 210 may be inferred based upon user signals (e.g., a sushi takeout activity on Mondays may be identified based upon device locations of the device 204 on Mondays corresponding to a sushi restaurant; a soccer practice activity on Tuesdays may be identified based upon device locations of the device 204 on Tuesdays corresponding to a soccer field; etc.). User signals may be verified and/or adjusted based upon a primary calendar 214 of the user 202 (e.g., a cancel soccer club membership calendar entry within the primary calendar 214 may be used to determine that the soccer practice activity on Tuesdays may be stale or irrelevant).

Figure 3:
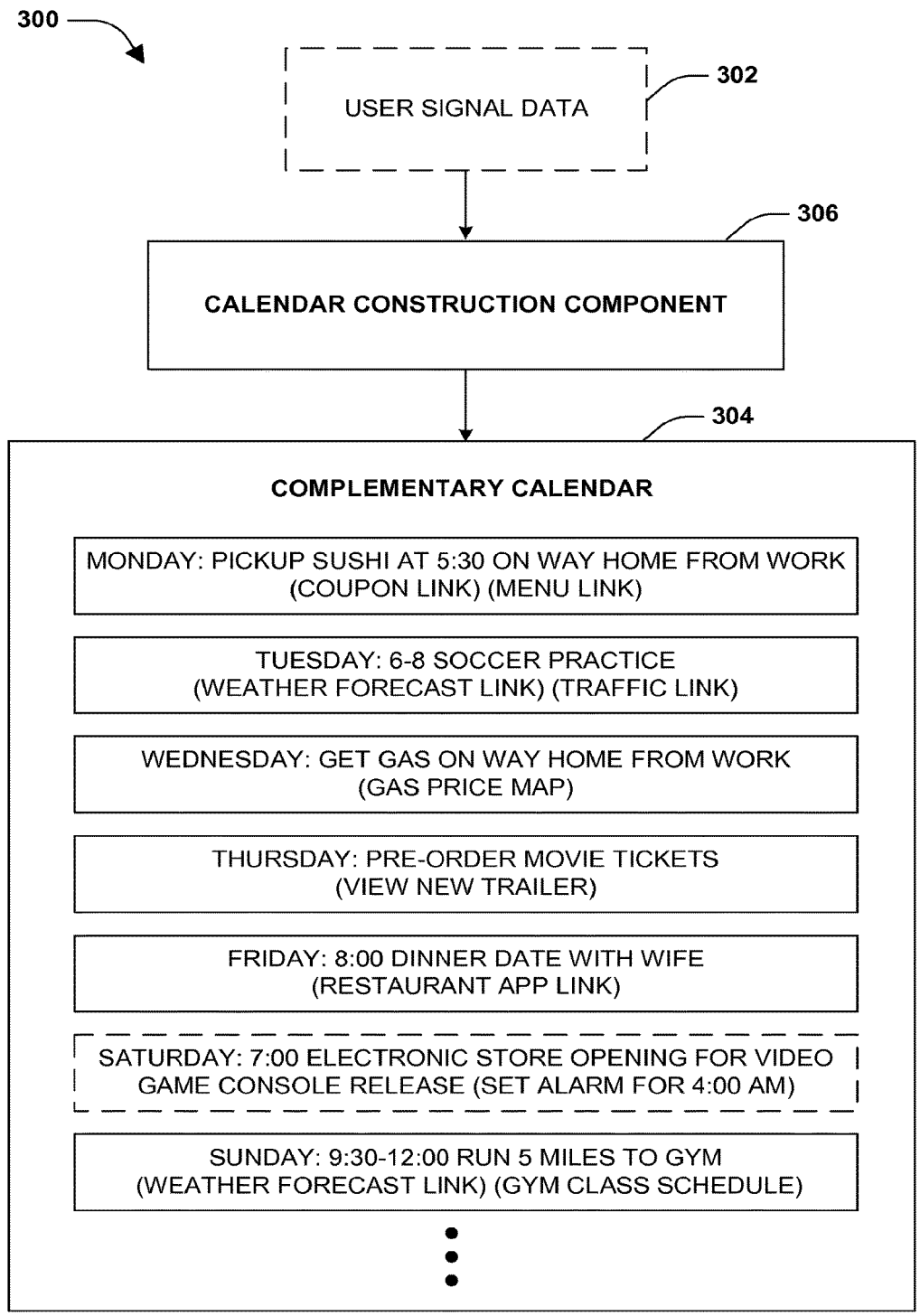
FIG. 3 is a component block diagram illustrating an exemplary system for constructing a complementary calendar.

FIG. 3 illustrates an example of a system 300 for constructing a complementary calendar 304. The system 300 comprises a calendar construction component 306. The calendar construction component 306 may be configured to identify user signal data 302 associated with a user 202 of a device 204 (e.g., FIG. 2). The calendar construction component 306 may be configured to construct the complementary calendar 304 based upon the user signal data 302, such as by populating the complementary calendar 304 with one or more entries derived/inferred from the user signal data 302. In an example, the calendar construction component 306 may construct the complementary calendar 304 based upon one or more calendars of the user (e.g., a family calendar, a social network calendar, a soccer team schedule calendar, and/or other potential calendars). In an example, a pickup sushi activity entry may be populated within the complementary calendar 304 based upon temporal and/or location information indicating that the user routinely picks up sushi on Mondays. Supplemental information, such as a coupon link and/or a menu link, maybe populated within the pickup sushi activity entry. In another example, a soccer practice activity entry may be populated within the complementary calendar 304 based upon a soccer team membership of the user with a soccer team and/or a soccer practice schedule published through a website of the soccer team. Supplemental information, such as a weather forecast link and/or a traffic link, may be populated within the soccer practice activity entry. In another example, a get gas activity entry may be populated within the complementary calendar 304 based upon a current gas status of a user vehicle. Supplemental information, such as an interactive gas price map, may be populated within the get gas activity entry.

In another example, a pre-order movie tickets activity entry may be populated within the complementary calendar 304 based upon a social network message of the user indicating a movie date night to a movie that is to be released on Thursday. Supplemental information, such as a view new trailer link, may be populated within the pre-order movie tickets activity entry. In another example, a dinner date with wife activity entry may be populated within the complementary calendar 304 based upon an email between the user and the user's spouse. Supplemental information, such as a restaurant app link to a restaurant app on the device 204, may be populated within the dinner date with wife activity entry. In another example, a videogame console release activity entry may be populated within the complementary calendar 304 based upon a preorder receipt file on the device 204 (e.g., because the videogame console release activity may have a relatively lower confidence of being correct, the videogame console release activity entry may be augmented, such as displayed with a dashed box). Supplemental information, such as a suggestion to set an alarm for 4:00 am so that the user may stand in line for a 6:00 am release event, may be populated within the videogame console release activity entry. In another example, a run to gym activity entry may be populated within the complementary calendar 304 based upon a mode of transportation indicating a running transportation mode on Sundays to a gym location. Supplemental information, such as a weather forecast link and/or a gym class schedule obtained from a gym website, may be populated within the run to gym activity entry.

Figure 4:
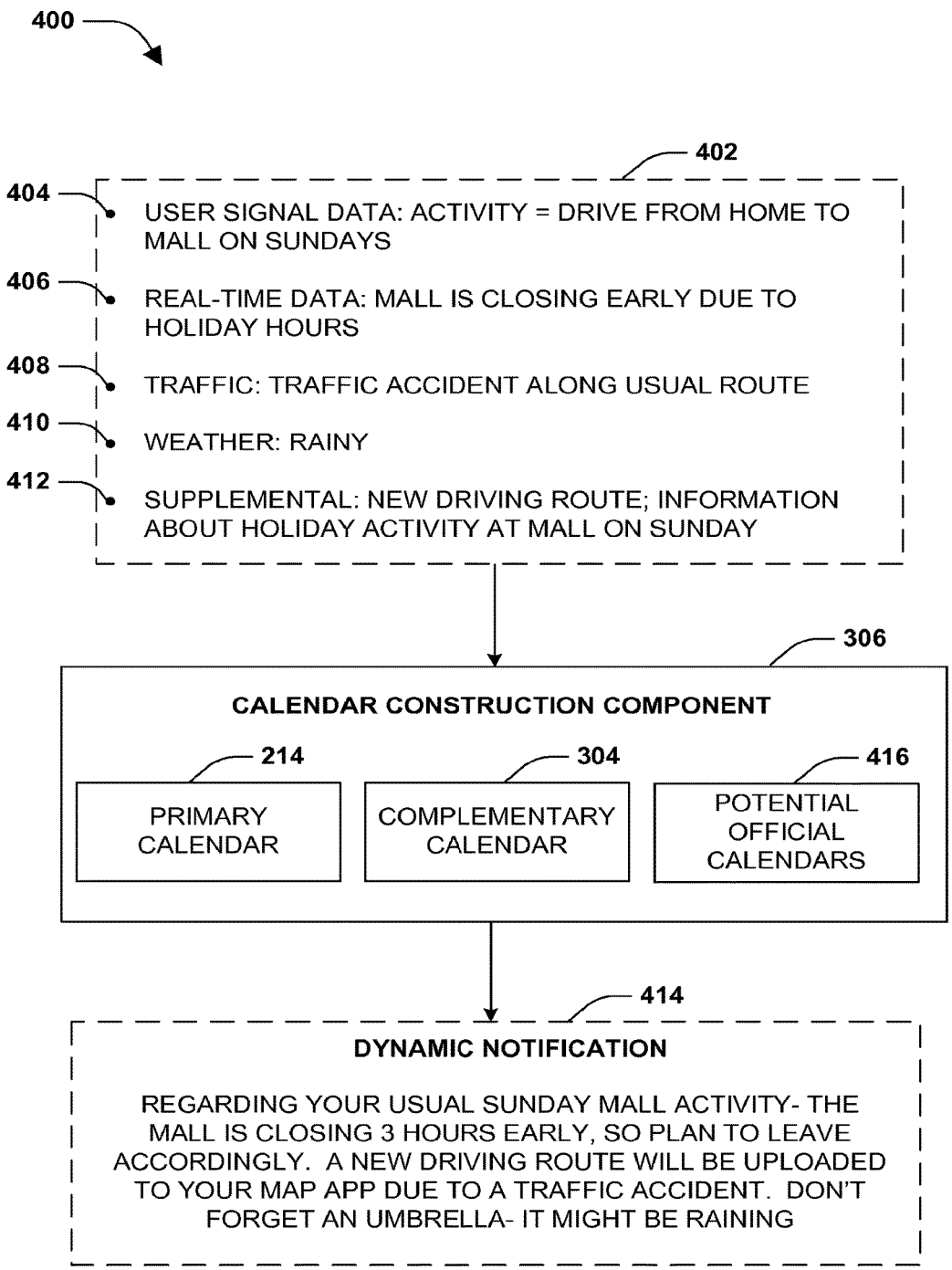
FIG. 4 is a component block diagram illustrating an exemplary system for providing a dynamic notification.

FIG. 4 illustrates an example of a system 400 for providing a dynamic notification 414. The system 400 comprises a calendar construction component 306. In an example, the calendar construction component 306 constructed a complementary calendar 304 (e.g., FIG. 3). The calendar construction component 306 may evaluate the complementary calendar 304, a primary calendar 214, one or more potential official calendars 416 (e.g., a family calendar, a soccer schedule calendar, a school schedule calendar, a social network calendar, etc.), and/or contextual information 402 (e.g., user signal data 404 indicating the user drives from home to a mall on Sundays; real-time data 406 indicating that the mall is closing early due to holiday hours; traffic information 408 indicating a traffic accident along a route usually taken by the user to the mall; weather information 410 indicating rain; and supplemental information 412 indicating a new driving route and information about a holiday activity occurring at the mall on Sunday) to generate the dynamic notification 414. For example, the dynamic notification 414 may provide a suggestion regarding the user's usual Sunday mall activity. In an example, the dynamic notification 414 may instruct the user to leave early because the mall is closing 3 hours early. The dynamic notification 414 may indicate that a new driving route will be uploaded to a map app due to a traffic accident. The dynamic notification 414 may indicate that the user should bring an umbrella due to potential rain.

Figure 5:
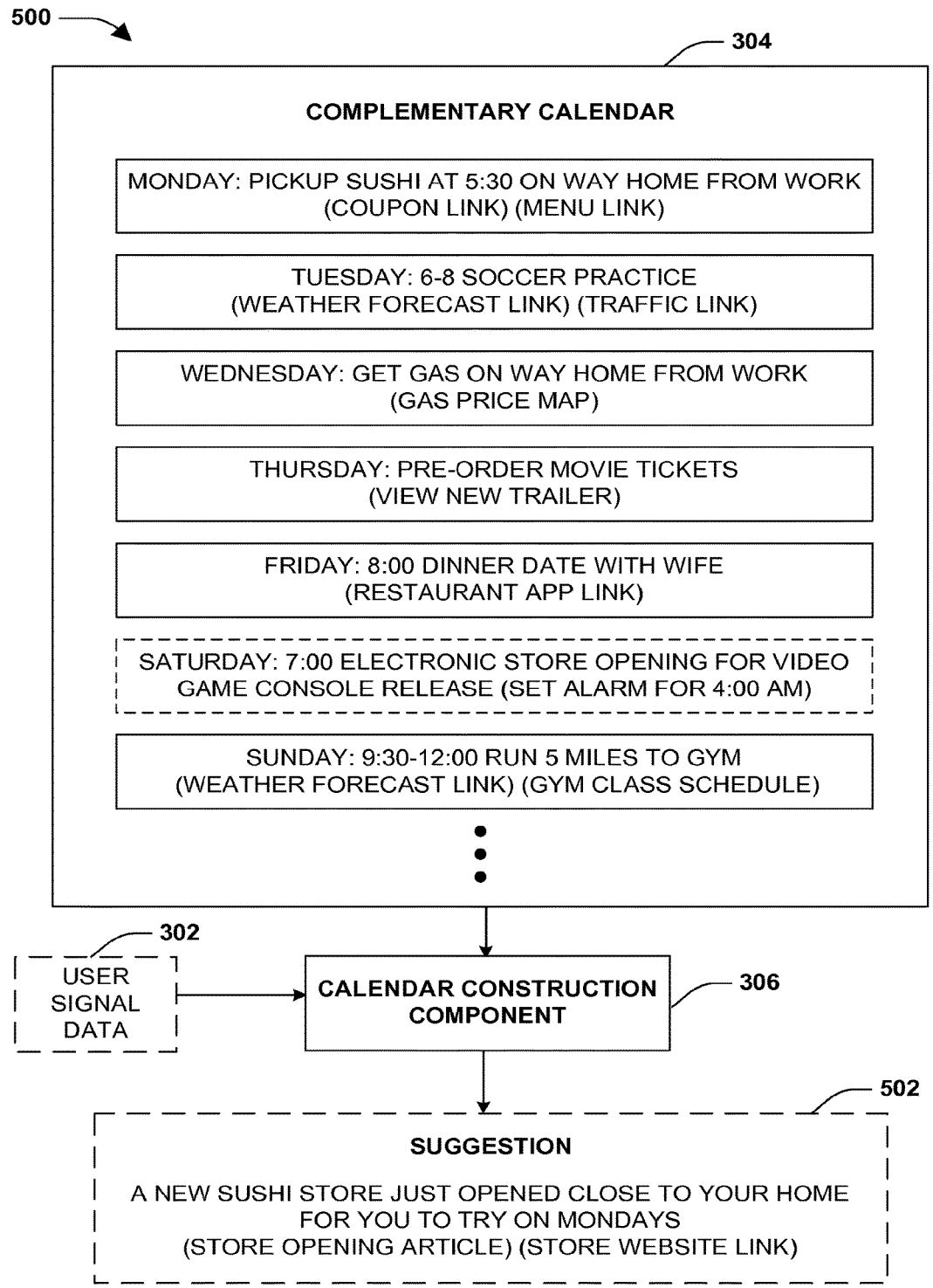
FIG. 5 is a component block diagram illustrating an exemplary system for providing a suggestion based upon user signal data and/or a complementary calendar.

FIG. 5 illustrates an example of a system 500 for providing a suggestion 502 based upon user signal data 302 and/or a complementary calendar 304. The system 500 comprises a calendar construction component 306. In an example, the calendar construction component 306 constructed a complementary calendar 304 based upon the user signal data 302 (e.g., FIG. 3). The calendar construction component 306 may evaluate a pickup sushi activity entry within the complementary calendar 304 to determine the user has an interest in sushi stores. Accordingly, the calendar construction component 306 may identify a new sushi store opening near the user's home (e.g., a news article may identify the new sushi store opening; a sushi store social network profile may indicate the new sushi store opening; the user signal data 302 may indicate a location of the user's home; etc.). Supplemental information, such as a store opening article and/or store website link, may be populated within the suggestion 502.

Figure 6:
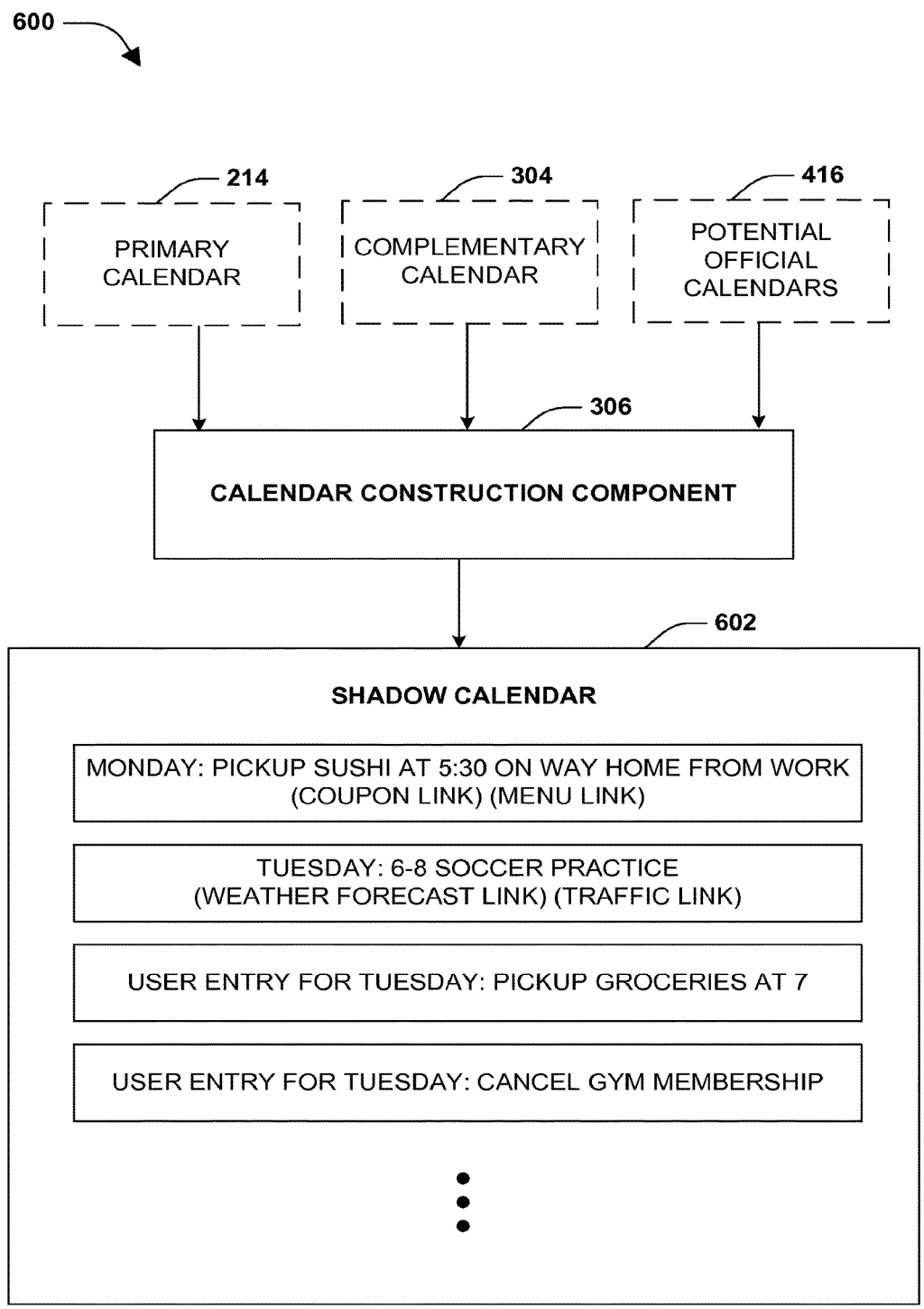
FIG. 6 is a component block diagram illustrating an exemplary system for constructing a shadow calendar.

FIG. 6 illustrates an example of a system 600 for constructing a shadow calendar 602. The system 600 comprises a calendar construction component 306. In an example, the calendar construction component 306 constructed a complementary calendar 304 (e.g., FIG. 3) and/or may have access to a primary calendar 214 of a user 202 of a device 204 (e.g., FIG. 2). The primary calendar 214 may comprise one or more user entries generated by the user 202, such as a pickup groceries user entry for Tuesday at 7:00 and/or a cancel gym membership user entry for Tuesday. The complementary calendar 304 may comprise one or more entries (e.g. automatically generated entries) corresponding to inferences derived from user signals. The calendar construction component 306 may merge the primary calendar 214 (e.g., user specified entries), the complementary calendar 304 (e.g., automatically generated/inferred entries), and/or one or more potential official calendars 416 (e.g., a family calendar, a soccer schedule calendar, a school schedule calendar, a social network calendar, etc.) to create the shadow calendar 602. In this way, the shadow calendar 602 comprises at least some of the primary calendar 214 and at least some of the complementary calendar 304. In an example, the primary calendar 214 may be used to validate and/or adjust entries within the complementary calendar and/or the shadow calendar 602, such as removing a run to gym activity entry on Sunday from the complementary calendar 304 (e.g., FIG. 3) and/or the shadow calendar 602 based upon the cancel gym membership user entry for Tuesday.

Figure 7:
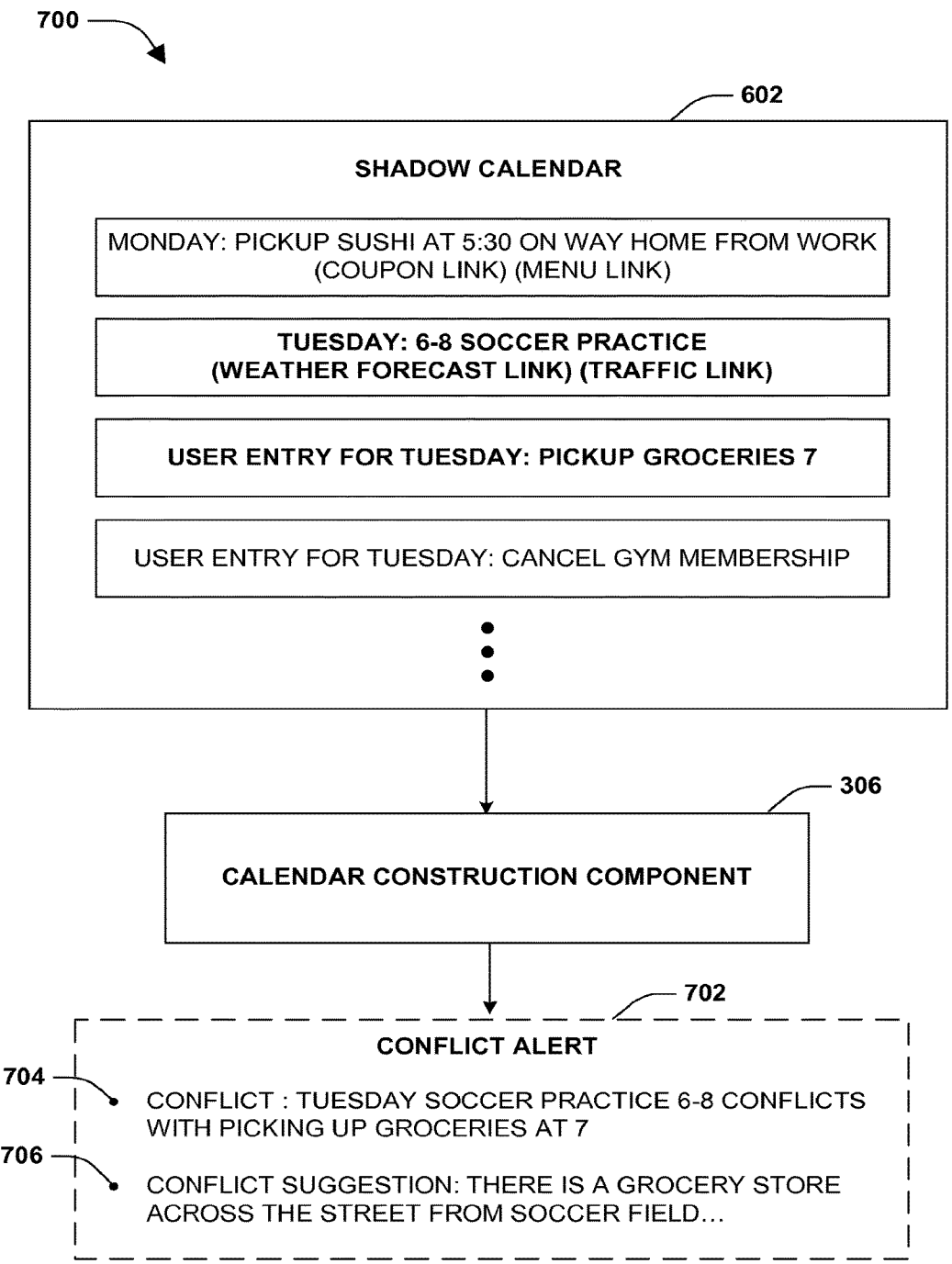
FIG. 7 is a component block diagram illustrating an exemplary system for providing a conflict alert based upon a shadow calendar.

FIG. 7 illustrates an example of a system 700 for providing a conflict alert 702 based upon a shadow calendar 602. The system 700 comprises a calendar construction component 306. In an example, the calendar construction component 306 constructed a shadow calendar 602 by merging a primary calendar 214 and a complementary calendar 304 (e.g., FIG. 6). Because the shadow calendar 602 may be populated with entries from the primary calendar 214 and the complementary calendar 304, the calendar construction component 306 may evaluate the shadow calendar 602 to identify conflicts, such as a conflict 704 between a soccer practice activity entry for Tuesday between 6:00 and 8:00 from the complementary calendar 304 and a pickup groceries user entry for Tuesday at 7:00 from the primary calendar 214. The calendar construction component 306 may provide a conflict alert 702 specifying the conflict 704 and/or a conflict suggestion 706, such as a suggestion to grocery shop at a grocery store located across the street from a soccer field where soccer practice is to take place.

Figure 8:
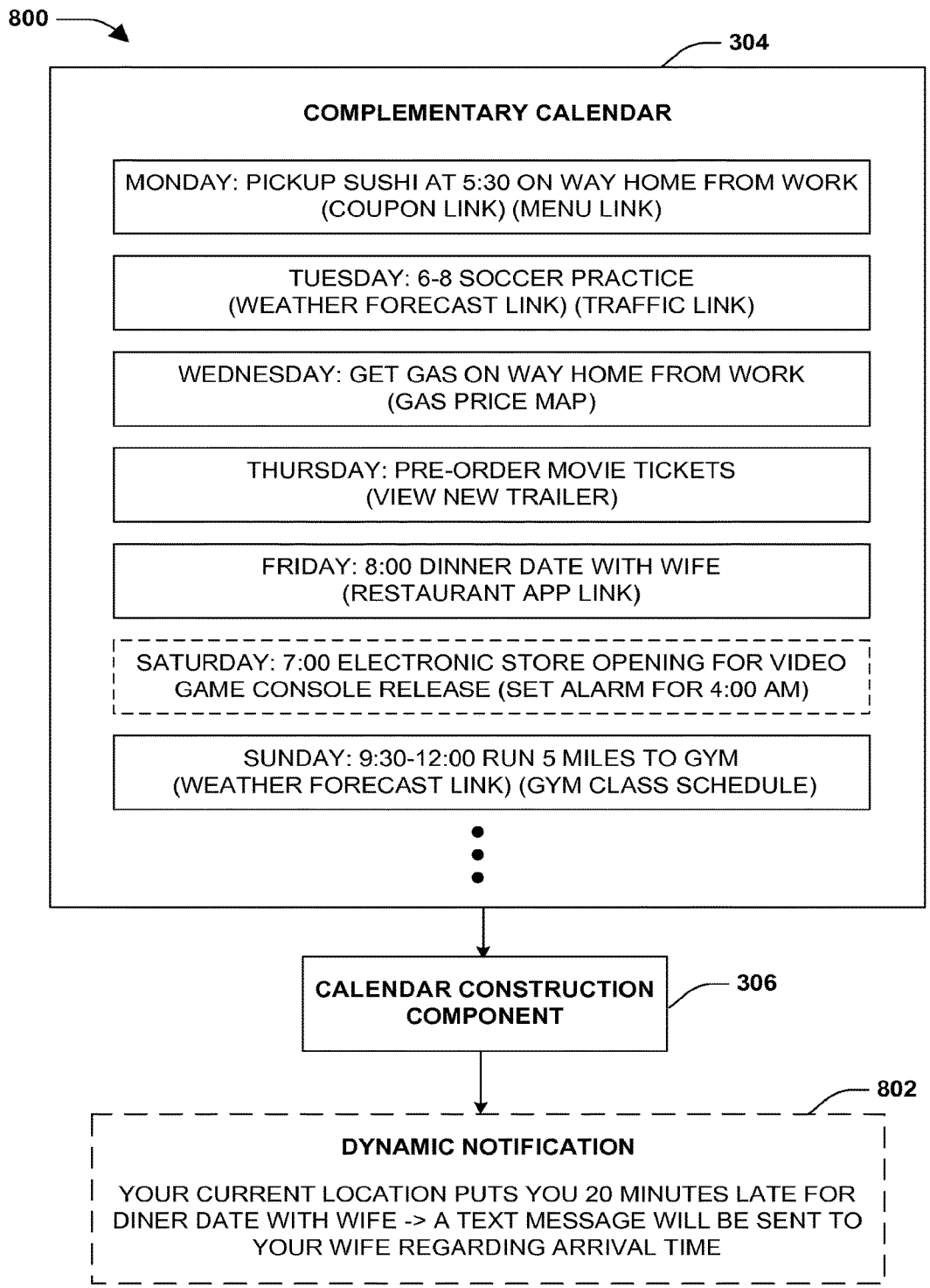
FIG. 8 is a component block diagram illustrating an exemplary system for providing a dynamic notification based upon a complementary calendar.

FIG. 8 illustrates an example of a system 800 for providing a dynamic notification 802 based upon a complementary calendar 304. The system 800 comprises a calendar construction component 306. In an example, the calendar construction component 306 constructed a complementary calendar 304 (e.g., FIG. 3). The complementary calendar 304 may comprise a dinner date with wife activity entry for Friday at 8:00. The calendar construction component 306 may determine that a current location of the user and a current time will put the user as arriving 20 minutes late for the dinner date. The calendar construction component 306 may provide the dynamic notification 802 indicating that an automated text message could be sent to the wife regarding the new arrival time (e.g., a send message button and/or a modify message text box may be provided to the user).

Figure 9:
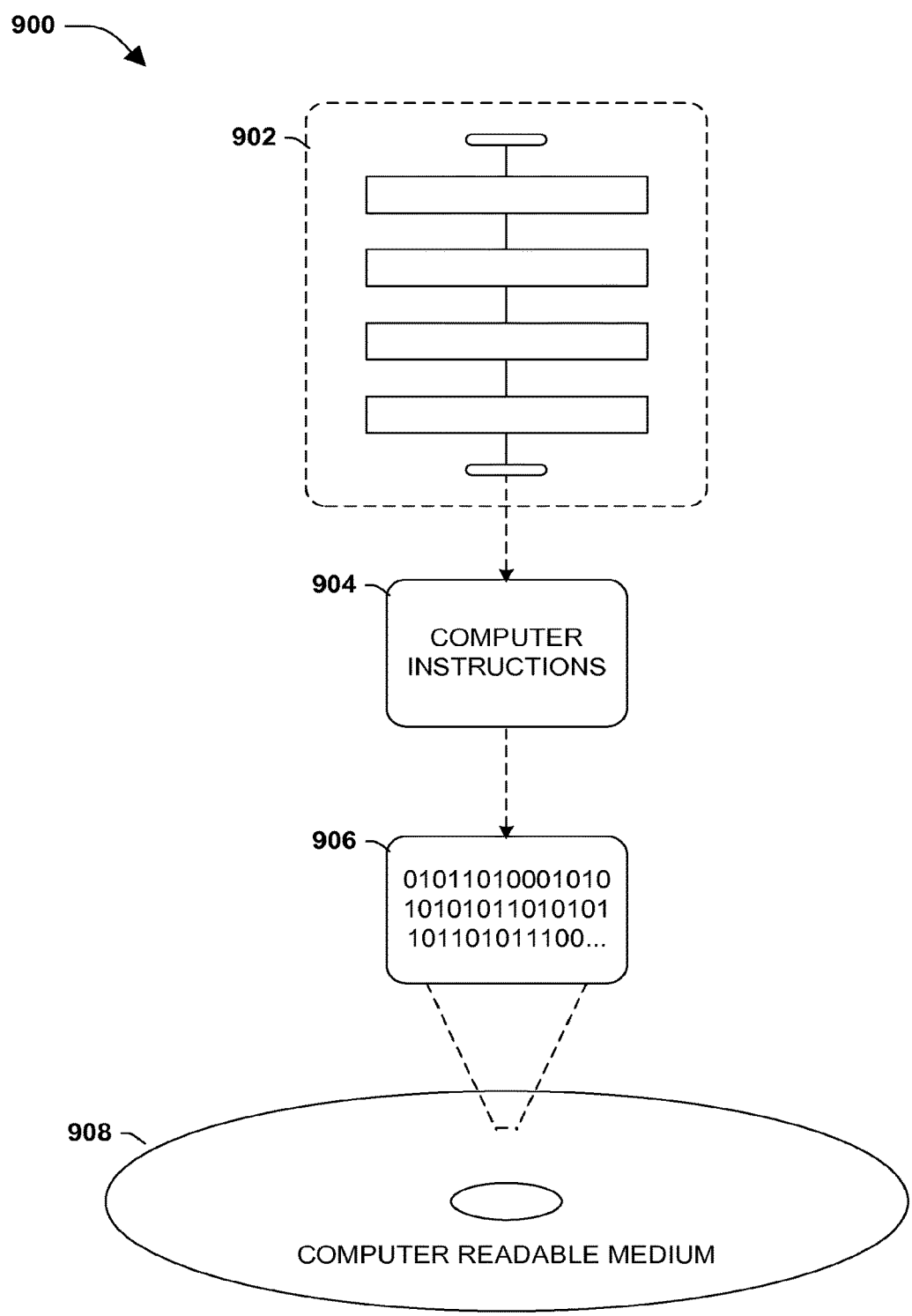
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1, for example. In some embodiments, the processor-executable instructions 904 are configured to implement a system, such as at least some of the exemplary system 300 of FIG. 3, at least some of the exemplary system 400 of FIG. 4, at least some of the exemplary system 500 of FIG. 5, at least some of the exemplary system 600 of FIG. 6, at least some of the exemplary system 700 of FIG. 7, and/or at least some of the exemplary system 800 of FIG. 8, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
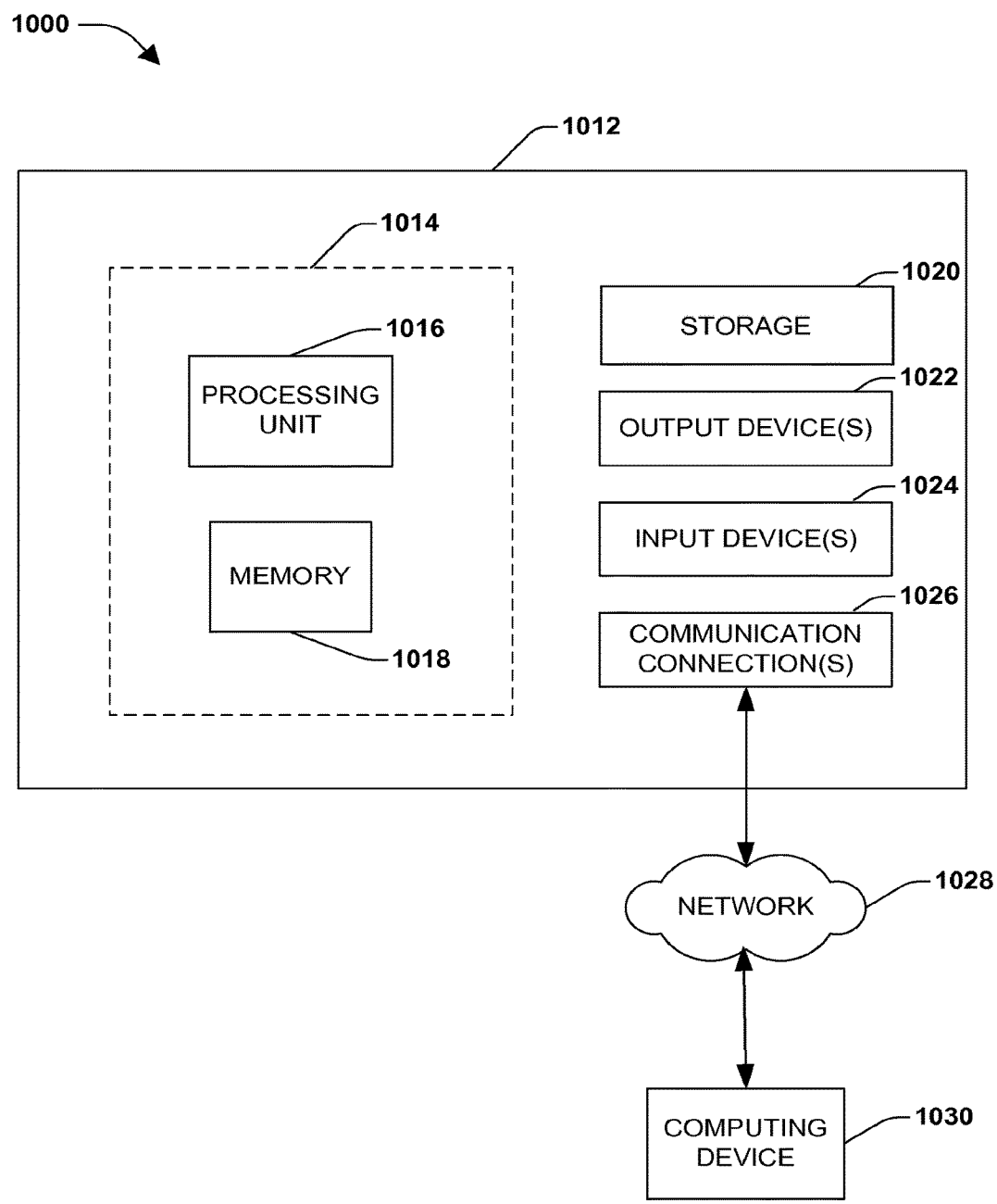
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Computer storage media does not, however, include propagated signals. Rather, computer storage media excludes propagated signals. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for enabling a computing device to construct a complementary calendar for a user of a user device, the method comprising:
   receiving schedule data from a primary calendar;
   identifying a user signal associated with the user of the user device, based on data received from the user device, wherein the user signal comprises a user activity performed by the user and one or more of time data, or location data, associated with the user activity performed by the user;
   evaluating a device context of the device to identify the activity of the user as the user signal;
   automatically generating an entry based on one or more inferences derived from the user signal comprising the user activity performed by the user, data received from the primary calendar, and one or more of the time data, or the location data, associated with the user activity performed by the user;
   populating the complementary calendar, wherein the complementary calendar is automatically populated with the entry based on the user signal; and
   generating a notification to the user based upon the automatically-generated entry in the complementary calendar.

2. The method of claim 1, the identifying the user signal comprising:
   evaluating a social network profile of the user to identify an activity of the user as the user signal.

3. The method of claim 1, the device context comprising at least one of: a device location, a device time, a mode of transportation, a device location check-in, an alarm, a charging state, a connectivity state, or user data stored on the device.

4. The method of claim 1, comprising:
   evaluating the user signal against at least one of traffic information, weather information, real-time data, or supplemental information to generate a dynamic notification; and
   providing the dynamic notification.

5. The method of claim 4, the dynamic notification indicative of a meeting attendance delay, and the method comprising:
   providing a notification of the meeting attendance delay to one or more meeting attendees of a meeting.

6. The method of claim 1, comprising:
   identifying the primary calendar of the user, the primary calendar comprising a user entry generated by the user;
   evaluating the entry in the complementary calendar against the user entry in the primary calendar to identify a conflict; and
   providing a conflict alert.

7. The method of claim 6, comprising:
   providing a conflict suggestion based upon the conflict.

8. One or more computer-storage media having embodied thereon computer-usable instructions which, when executed by one or more processors, implement a method for enabling a computing device to construct a complementary calendar for a user of a user device, the method comprising:
   receiving schedule data from a primary calendar;
   identifying a user signal associated with the user of the user device, based on data received from the user device, wherein the user signal comprises a user activity historically performed by the user and one or more of time data, or location data, associated with the user activity;
   evaluating a device context of the device to identify the user activity as the user signal;
   automatically generating an entry based on the user signal, data received from the primary calendar, and one or more of the time data, or the location data, associated with the user activity, wherein the entry corresponds to a future activity that may be performed by the user;
   populating the complementary calendar, wherein the complementary calendar is automatically populated with the entry based on the user signal; and
   generating a notification to the user based upon the automatically-generated entry in the complementary calendar.

9. The one or more computer-storage media of claim 8, the method further comprising:
   displaying the complementary calendar.

10. The one or more computer-storage media of claim 8, the method further comprising:
    identifying a recurring activity based upon the user signal; and
    deriving the entry based upon the recurring activity.

11. The one or more computer-storage media of claim 8, the method further comprising:
    merging the complementary calendar with at least one of the primary calendar or one or more potential official calendars to create a shadow calendar, wherein the shadow calendar comprises the entry in the complementary calendar and one or more user-generated entries from the primary calendar or the one or more potential official calendars.

12. The one or more computer-storage media of claim 8, the method further comprising:
    generating a suggestion based upon the user signal; and providing the suggestion.

13. The one or more computer-storage media of claim 8, the method further comprising:
    displaying the complementary calendar; and
    augmenting the entry based upon a confidence metric.

14. The one or more computer-storage media of claim 8, the method further comprising:
    verifying the entry based upon the primary calendar.

15. A system for constructing a complementary calendar for a user of a user device, the system comprising:
    one or more processors;
    one or more computer storage media having embodied thereon instructions which, when executed by the one or more processors, cause the one or more processors to implement steps comprising:
    receive schedule data from a primary calendar;
    identify a user signal associated with the user of the user device, based on data received from the user device, wherein the user signal comprises a user activity performed by the user and one or more of time data, or location data, associated with the user activity performed by the user;
    evaluate a device context of the device to identify the activity of the user as the user signal;
    automatically generate an entry based on one or more inferences derived from the user signal comprising the user activity performed by the user, data received from the primary calendar, and one or more of the time data, or the location data, associated with the user activity performed by the user;
    populate the complementary calendar, wherein the complementary calendar is automatically populated with the entry based on the user signal; and
    generate a notification to the user based upon the automatically-generated entry in the complementary calendar.

16. The system of claim 15, wherein identify the user signal comprises:
    evaluate a social network profile of the user to identify an activity of the user as the user signal.

17. The system of claim 15, the device context comprising at least one of: a device location, a device time, a mode of transportation, a device location check-in, an alarm, a charging state, a connectivity state, or user data stored on the device.

18. The system of claim 15, the steps further comprising:
    evaluate the user signal against at least one of traffic information, weather information, real-time data, or supplemental information to generate a dynamic notification; and
    provide the dynamic notification.

19. The system of claim 18, the dynamic notification indicative of a meeting attendance delay, and the steps further comprising:
    provide a notification of the meeting attendance delay to one or more meeting attendees of a meeting.

20. The system of claim 15, the steps further comprising:
    identify the primary calendar of the user, the primary calendar comprising a user entry generated by the user;
    evaluate the entry in the complementary calendar against the user entry in the primary calendar to identify a conflict; and
    provide a conflict alert.

* * * * *